US006967806B2

(12) United States Patent
Rao et al.

(10) Patent No.: US 6,967,806 B2
(45) Date of Patent: Nov. 22, 2005

(54) ELECTROSTATIC ACTUATOR WITH MULTILAYER ELECTRODE STACK

(75) Inventors: Ram Mohan Rao, Shoreview, MN (US); Tim William Stoebe, Minnetonka, MN (US); Deborah Susan Schnur, Minneapolis, MN (US); Zine Eddine Boutaghou, North Oaks, MN (US); Wayne Allen Bonin, North Oaks, MN (US); Jianxin Zhu, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 123 days.

(21) Appl. No.: 10/440,735

(22) Filed: May 19, 2003

(65) Prior Publication Data

US 2004/0233568 A1    Nov. 25, 2004

(51) Int. Cl.$^7$ .............................................. G11B 21/02
(52) U.S. Cl. ....................................................... 360/75
(58) Field of Search ....................... 360/75, 103, 294.4, 360/294.11

(56) References Cited

U.S. PATENT DOCUMENTS

| | | | |
|---|---|---|---|
| 4,605,977 A | 8/1986 | Matthews | 360/103 |
| 4,823,205 A | 4/1989 | Hannon et al. | 369/14 |
| 4,853,810 A * | 8/1989 | Pohl et al. | 360/234.7 |
| 4,931,887 A | 6/1990 | Hegde et al. | 360/75 |
| 5,764,432 A * | 6/1998 | Kasahara | 360/75 |
| 5,920,978 A * | 7/1999 | Koshikawa et al. | 29/603.12 |
| 6,005,736 A | 12/1999 | Schreck | 360/75 |
| 6,088,907 A | 7/2000 | Lee et al. | 29/603.03 |
| 6,269,687 B1 * | 8/2001 | Zhang et al. | 73/105 |
| 6,359,746 B1 | 3/2002 | Bakekado et al. | 360/75 |
| 6,366,416 B1 | 4/2002 | Meyer et al. | 360/25 |
| 6,700,724 B2 * | 3/2004 | Riddering et al. | 360/69 |
| 2002/0030938 A1 | 3/2002 | Boutaghou et al. | 360/236.3 |
| 2002/0097517 A1 | 7/2002 | Bonin et al. | 360/75 |
| 2002/0154440 A1 | 10/2002 | Bonin et al. | 360/78.04 |
| 2003/0043497 A1 * | 3/2003 | Riddering et al. | 360/75 |

* cited by examiner

*Primary Examiner*—David Hudspeth
*Assistant Examiner*—K. Wong
(74) *Attorney, Agent, or Firm*—Westman, Champlin & Kelly

(57) ABSTRACT

An electrostatic actuator for adjusting a spacing. A first body has an electrically conducting surface, and a second body has a body surface separated by the spacing from the electrically conducting surface. A conductor layer and an actuator electrode are recessed in the second body, and an electrode face faces the electrically conducting surface across the spacing. The actuator electrode comprises a semi-insulating material with a combination of electrical resistivity and thickness which prevents shorting of the conductor layer to the electrical conducting surface through a dielectric breakdown in the spacing.

27 Claims, 14 Drawing Sheets

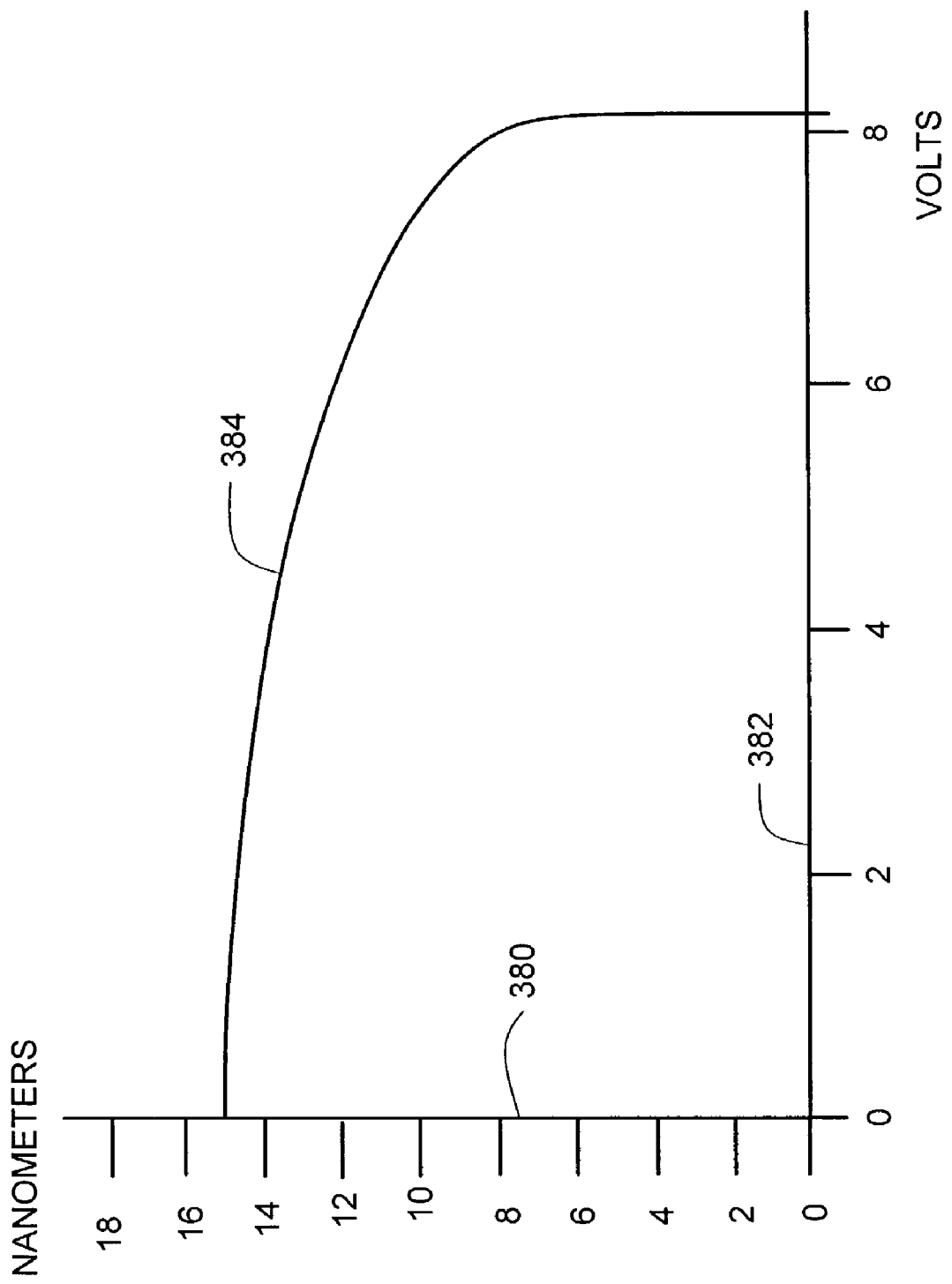

US 6,967,806 B2

ELECTROSTATIC ACTUATOR WITH MULTILAYER ELECTRODE STACK

FIELD OF THE INVENTION

The present invention relates generally to electrostatic actuators, and more particularly but not by limitation to electrostatic actuators for controlling fly height in a disc drive.

BACKGROUND OF THE INVENTION

As fly height decreases in disc drives, it becomes increasingly difficult to maintain a flying interface between the recording head and the disc. Manufacturing variations, environmental conditions such as temperature and altitude, disc topography and other factors can cause mechanical spacing losses. One method to compensate for these spacing losses is to control fly height using electrostatic force. A control voltage can be applied between the entire slider body (or to dedicated slider electrodes) and a disc in order to create an attractive electrostatic force between the slider and the disc. Dedicated electrodes are preferred because they can be designed to avoid contact with the disc and prevent catastrophic failure of the interface caused by "snap-over". Snap-over occurs when there is a sudden reduction in spacing and the electrostatic force suddenly becomes larger than the air bearing lift force and causes the head to crash. Electrostatic force can increase rapidly when the head-disc spacing is reduced because electrostatic force is inversely proportional to the square of the spacing. Dedicated electrodes also have the advantage that they allow the slider body to be grounded to prevent electrostatic discharge damage to the read-write transducer.

A problem with prior art electrostatic spacing control is that occasional air dielectric breakdown between the electrode and a conducting surface may be impossible to completely eliminate, due to asperities on the conducting surface, loose particles which may pass between the conducting surface and electrode from time to time, or other dielectric breakdowns that crash the head. An arrangement of an electrostatic actuator is needed that can tolerate dielectric breakdown, brief contacts with asperities or loose particles without crashing.

Embodiments of the present invention provide solutions to these and other problems, and offer other advantages over the prior art.

SUMMARY OF THE INVENTION

Disclosed is an electrostatic actuator for adjusting a spacing. The electrostatic actuator comprises a first body including an electrically conducting surface, and a second body having a body surface separated by the spacing from the electrically conducting surface.

A conductor layer with a conductor face is insulatingly recessed in the body surface of the second body. An actuator electrode is disposed on the conductor face and has an electrode face that faces the electrically conducting surface across the spacing. The actuator electrode comprises a semi-insulating material. The semi-insulating material has a combination of electrical resistivity and thickness which prevents shorting of the conductor layer to the electrical conducting surface through dielectric breakdown in the spacing.

Other features and benefits that characterize embodiments of the present invention will be apparent upon reading the following detailed description and review of the associated drawings.

BRIEF DESCRIPTION OF THE DRAWINGS

FIG. 16 illustrates a graph of pole to disc spacing as a function of electrode voltage for the arrangement illustrated in FIG. 15.

DETAILED DESCRIPTION OF ILLUSTRATIVE EMBODIMENTS

The present application discloses a semi-insulating electrode coating over a conductive layer. The semi-insulating electrode coating and the conductive layer, taken together, comprise a multilayer electrode stack. The conductive layer, which is typically metal, ensures that a uniform voltage is applied across the length and breadth of the semi-insulating layer. The semi-insulating electrode coating has a combination of thickness and electrical resistivity that limits destructive electrical discharge between the electrode and the disc in the event of contact through air dielectric breakdown which may result from an asperity, a loose particle or other causes. When the multilayer electrode stack is deposited on a body that is not insulating, then the multilayer electrode stack can also include an insulation layer that insulates the conductor layer from the body.

During normal operation, the semi-insulating electrode coating maintains the same electric potential as that applied to the conductor layer, so the coating does not reduce the available electrostatic force. Since the spacing between the coating surface and the disc can be safely made smaller than a spacing between a bare metal electrode and the disc, the usable electrostatic force is greater with the semi-insulating electrode coating.

Figure 1:
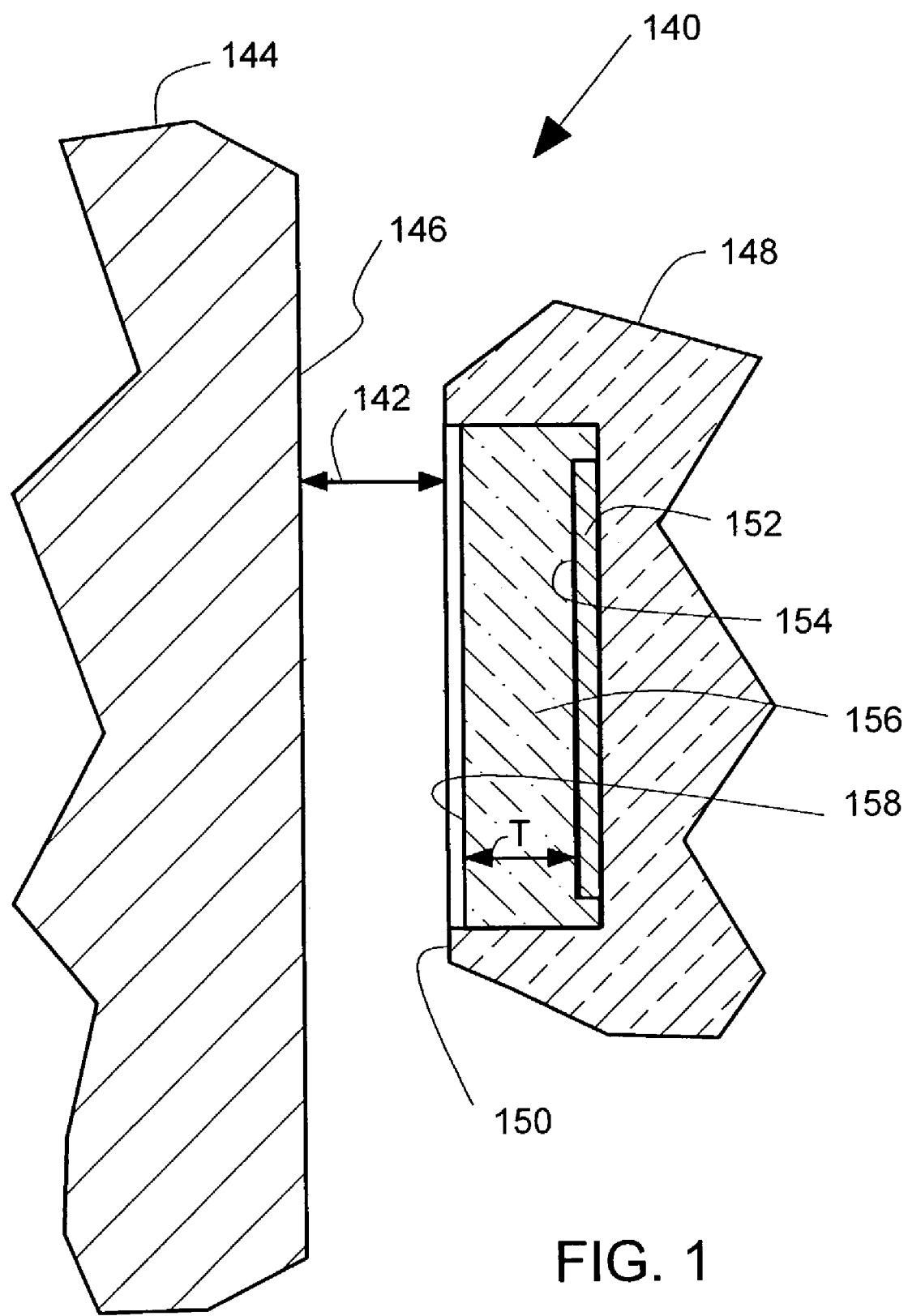
FIG. 1 illustrates a first embodiment of an electrostatic actuator.

FIG. 1 illustrates a cross-sectional view of a first embodiment of an electrostatic actuator 140 for adjusting a spacing 142. The electrostatic actuator 140 comprises a first body 144 that includes an electrically conducting surface 146 that is preferably generally flat. The electrostatic actuator 140 also comprises a second body 148 that has a body surface 150 separated by the spacing 142 from the electrically conducting surface 146. The surfaces 146, 150 are preferably approximately parallel to one another. A conductor layer 152 is insulatingly recessed in the second body surface 150. The conductor layer 152 has a conductor face 154 that is preferably flat and faces the electrical conducting surface 146.

An actuator electrode 156 is disposed on the conductor face 154 and has an electrode face 158 that faces the electrically conducting surface 146 across the spacing 142. The actuator electrode 156 comprises a semi-insulating material having a combination of electrical resistivity and thickness T which prevents shorting of the conductor layer 152 to the electrical conducting surface 146 through a dielectric breakdown in the spacing 142. The dielectric breakdown can be caused by a loose debris particle, or by a particle, such as a surface asperity, that is attached to the electrically conducting surface 146, or by other causes. The surfaces 146, 150 preferably slide relative to one another and the presence of any asperity, debris particle or other dielectric breakdown is of temporary duration.

In a preferred arrangement, the electrostatic actuator 140 is charged to generate an electrostatic attractive force to control the spacing 142 while the first and second bodies 144, 148 slide or move relative to one another in a direction transverse to the spacing 142. In such an arrangement, the air dielectric can break down, a loose particle can temporarily enter the gap or spacing 142, or a surface protrusion or asperity on electrically conducting surface 146 can temporarily move into the gap 142. In one preferred arrangement, the first body 144 comprises a data storage medium and the second body 148 comprises a data access device that is positioned over a selected location on the electrically conducting surface to access a selected portion of data stored in the data storage medium. The data may be stored in optical, magnetic, magneto-optic, or other known data storage medium.

In another preferred arrangement, the second body 148 is formed of electrically insulating material and the conductor layer 152 is disposed directly on the second body 148. The spacing 142 is preferably very small and no more than about 250 Angstroms (1 microinch). to provide adequate actuator force without exceeding the dielectric strength of air or other gas in the spacing 142.

Figure 2:
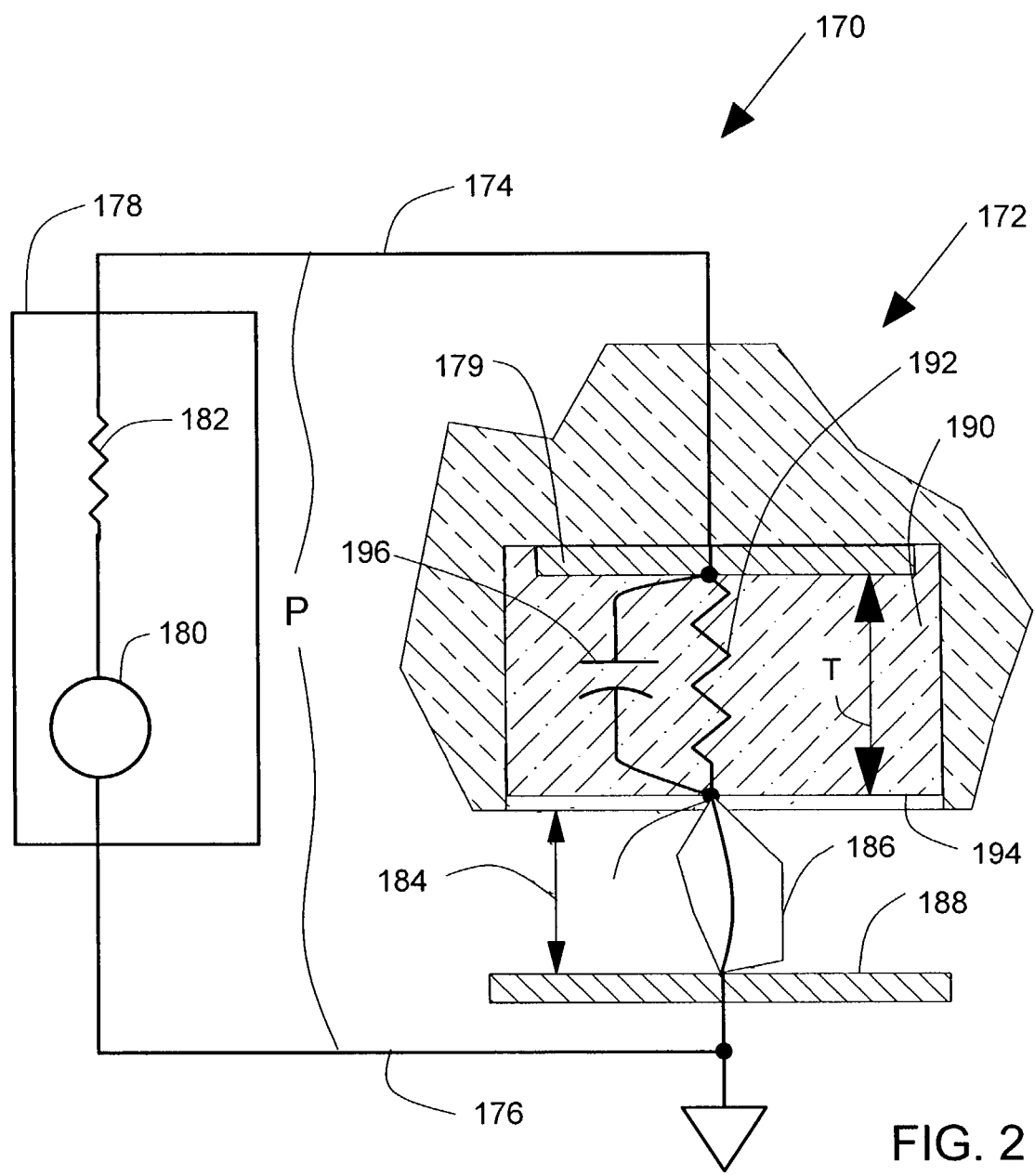
FIG. 2 illustrates a schematic diagram of an electrostatic actuator circuit.

FIG. 2 illustrates a schematic diagram of an electrostatic actuator circuit 170. The electrostatic actuator circuit 170 includes an electrostatic actuator 172 (similar to the electrostatic actuator 140 illustrated in FIG. 1) that is electrically connected by conductors 174, 176 to an electrical potential source 178. As illustrated, the electrical potential source 178 is modeled as a voltage source 180 in series with a source resistance 182. The electric potential source 178 provides a potential P between conductors 174 and 176. The voltage source 178 preferably provides an adjustable control voltage for controlling a spacing 184, and the control voltage is preferably a function of feedback of a parameter that depends on the spacing 184. The electrical potential source 178 charges a conductor layer 179 relative to an electrically conducting surface 188.

The spacing 184 is subject to transient contamination by a particle 186 or subject to breakdown of the air dielectric. The particle 186 can be a loose particle as illustrated, or attached to the electrically conducting surface 188 in the form of a surface asperity. Semi-insulating material 190 has an electrical resistance 192 that, upon a short circuit of an electrode face 194 to the electrically conducting surface 188 by the particle 186, limits electrical discharge of the conductor layer 179.

The semi-insulating material 190 has a relaxation time associated with an RC time constant of the resistance 192 and a capacitance 196. The capacitance 196 is the combination of the capacitance within the actuator electrode 190 and stray capacitances. In a preferred arrangement, after removal of a temporary dielectric breakdown such as a short circuit by the particle 186, the electrode face near the particle contact point recharges to 63% of a potential on the conductor layer 179 in no more than 50 microseconds. The fast recharging allows for a rapid recovery of the capacitive actuator so that stable control of the spacing 184 is maintained. The resistance 192 also prevents short circuiting of the electrical potential source 178. The actuator electrode 172 has a shorted resistance 192 through the dielectric breakdown, and the shorted resistance is at least 10 times the source resistance 182.

Figure 3:
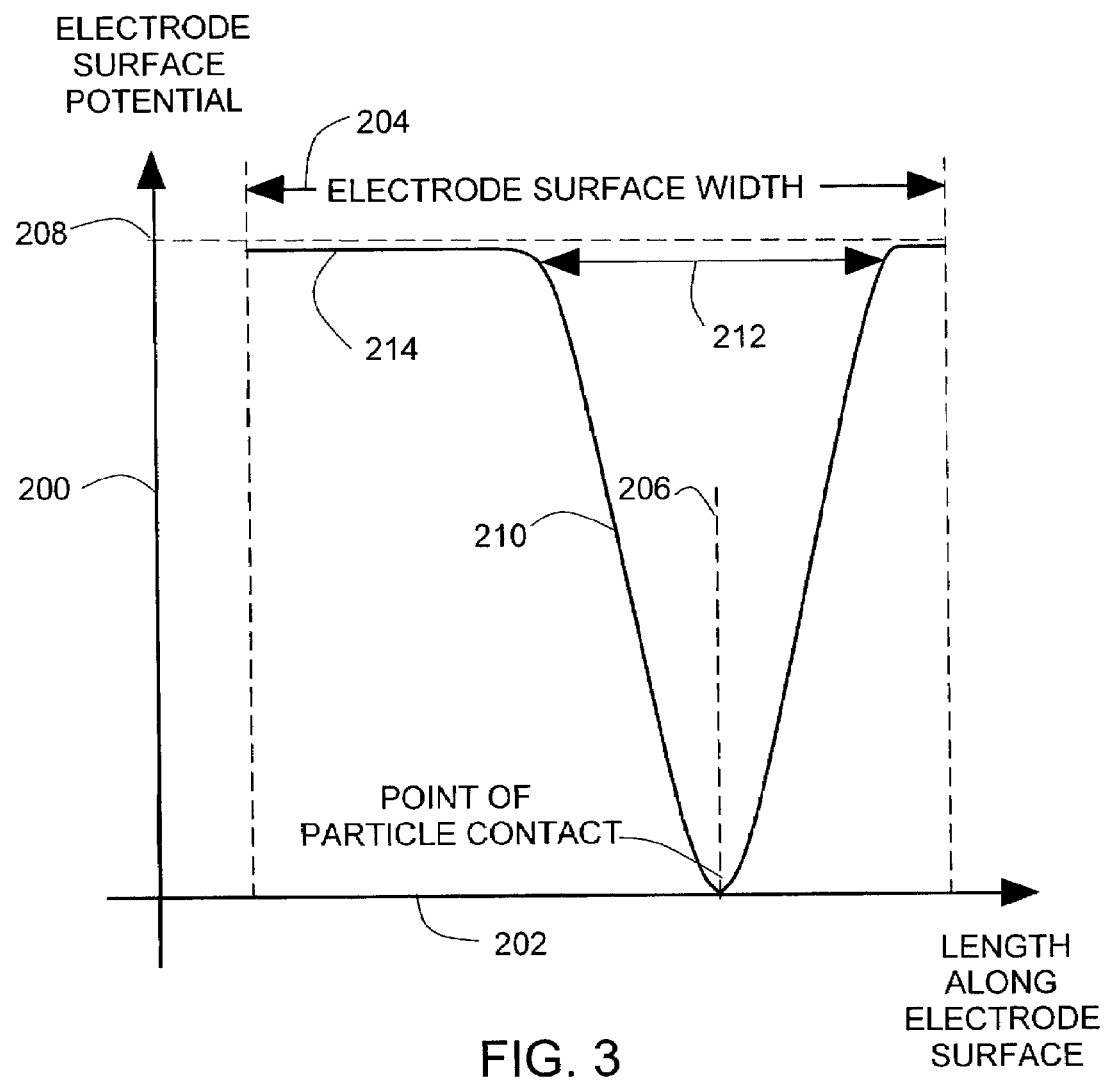
FIG. 3 illustrates localized short circuiting of an electrode face.

FIG. 3 illustrates localized short circuiting of an electrode face by breakdown of the air dielectric, or contact with a particle of asperity. In FIG. 3, a vertical axis 200 represents an electrode surface potential at an electrode surface (such as electrode surface 194 in FIG. 2.). A horizontal axis 202 represents length along the electrode surface across an electrode surface width 204. A vertical dashed line 206 represents a point of dielectric breakdown (such as contact by particle 186 in FIG. 2). A horizontal dashed line 208 represents a potential on a recessed conductor layer (such as conductor layer 179 in FIG. 2) that is in contact with an actuator electrode (such as actuator electrode 190 in FIG. 2). A solid line 210 schematically represents variation in electrode surface potential. The shape of the solid line 210 can be adjusted by selection of electrical resistivity and thickness of the actuator electrode. Short circuiting by the dielectric breakdown is localized to a localized portion 212 of the electrode face around the dielectric breakdown, and portions 214 of the electrode face that are remote from the dielectric breakdown are not short circuited. The thickness and electrically resistivity for a particular application geometry are ascertained by computer modeling of electrostatic fields in the actuator to control the diameter of the localized portion 212. When dielectric breakdown occurs, a large part of the surface area of the electrode face remote from the point of dielectric breakdown can function normally to provide actuation.

Figure 4:
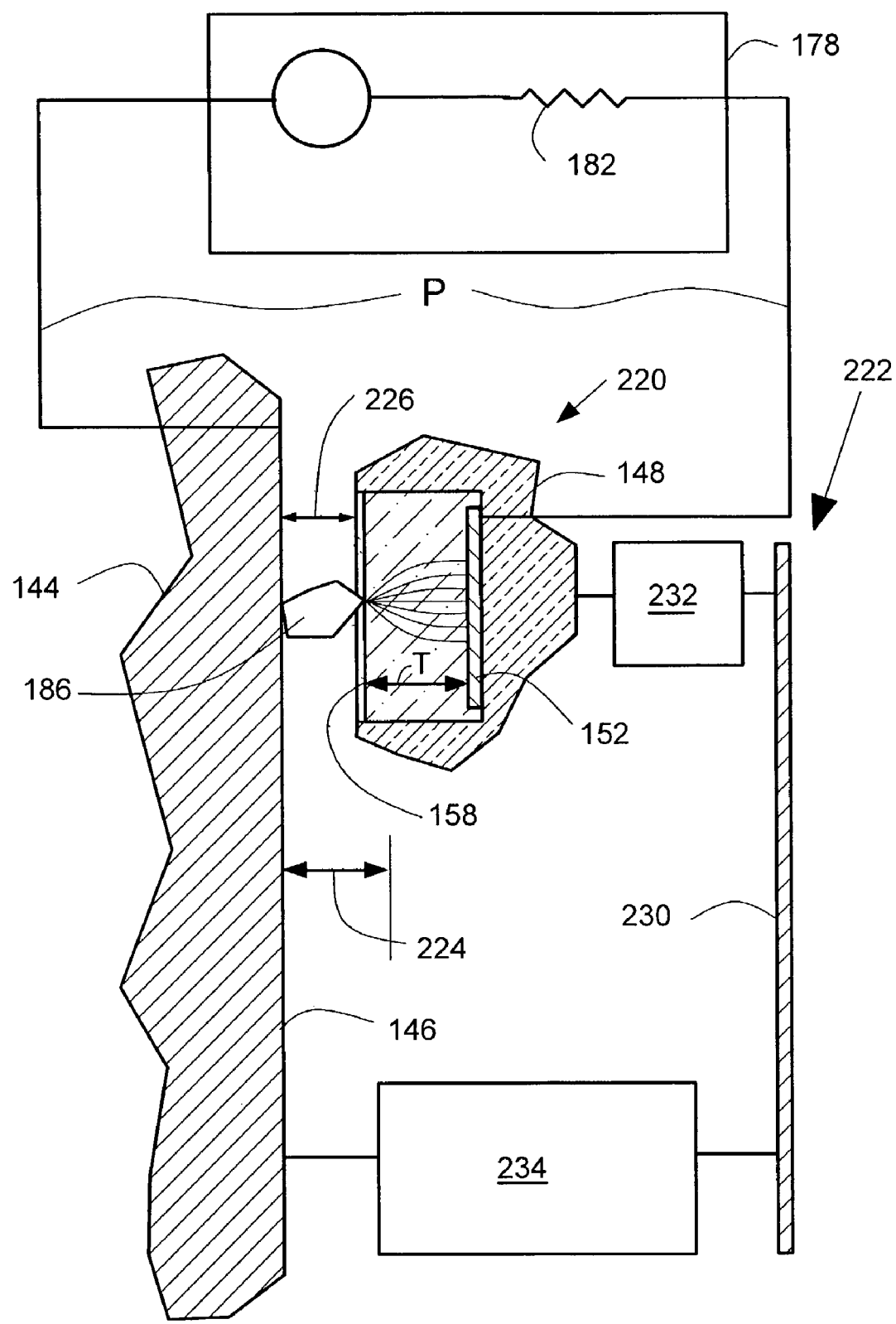
FIG. 4 illustrates a second embodiment of an electrostatic actuator.

FIG. 4 illustrates a second embodiment of an electrostatic actuator 220. The actuator 220 in FIG. 4 is similar to the actuators 140, 172 illustrated in FIGS. 1–2 and reference numerals in FIG. 4 that are the same as reference numerals in FIG. 1–2 identify the same or similar features.

In FIG. 4, a suspension 222 couples between a first body 144 and a second body 148 to resiliently suspend the second body 148 at a nominal spacing 224 from the first body 144. A potential source 178 applies an adjustment potential P between a conductor layer 152 and an electrically conducting surface 146 to generate an electrostatic attractive force between an electrode face 158 and the electrically conducting surface 146. The electrostatic attractive force adjusts the spacing from the nominal spacing 224 to an adjusted spacing 226.

In a preferred arrangement, the suspension 222 comprises a spring element 230 that provides a resilient force opposing the electrostatic force and restoring the second body to the nominal spacing 224 when the electrostatic force is removed. The spring element 230 can comprise a mechanical spring, aerodynamic lift, a combination of a mechanical spring and aerodynamic lift, or other known resilient forces. The suspension 222 also preferably comprises one or more translational motion elements 232, 234 that move the second body 148 in a desired pattern over the electrically conducting surface 146. The translational motion elements 232, 234 can comprise, for example, a voice coil motor, a disc drive motor, a piezoelectric actuator or other know motion control devices.

The potential source 178 has a source resistance 182 and the actuator electrode has a shorted resistance along a path through a debris particle 186, and the shorted resistance is at least 10 times the source resistance, ensuring that the debris particle 186 cannot short the conductor layer 152 to the first body 144.

Figure 5:
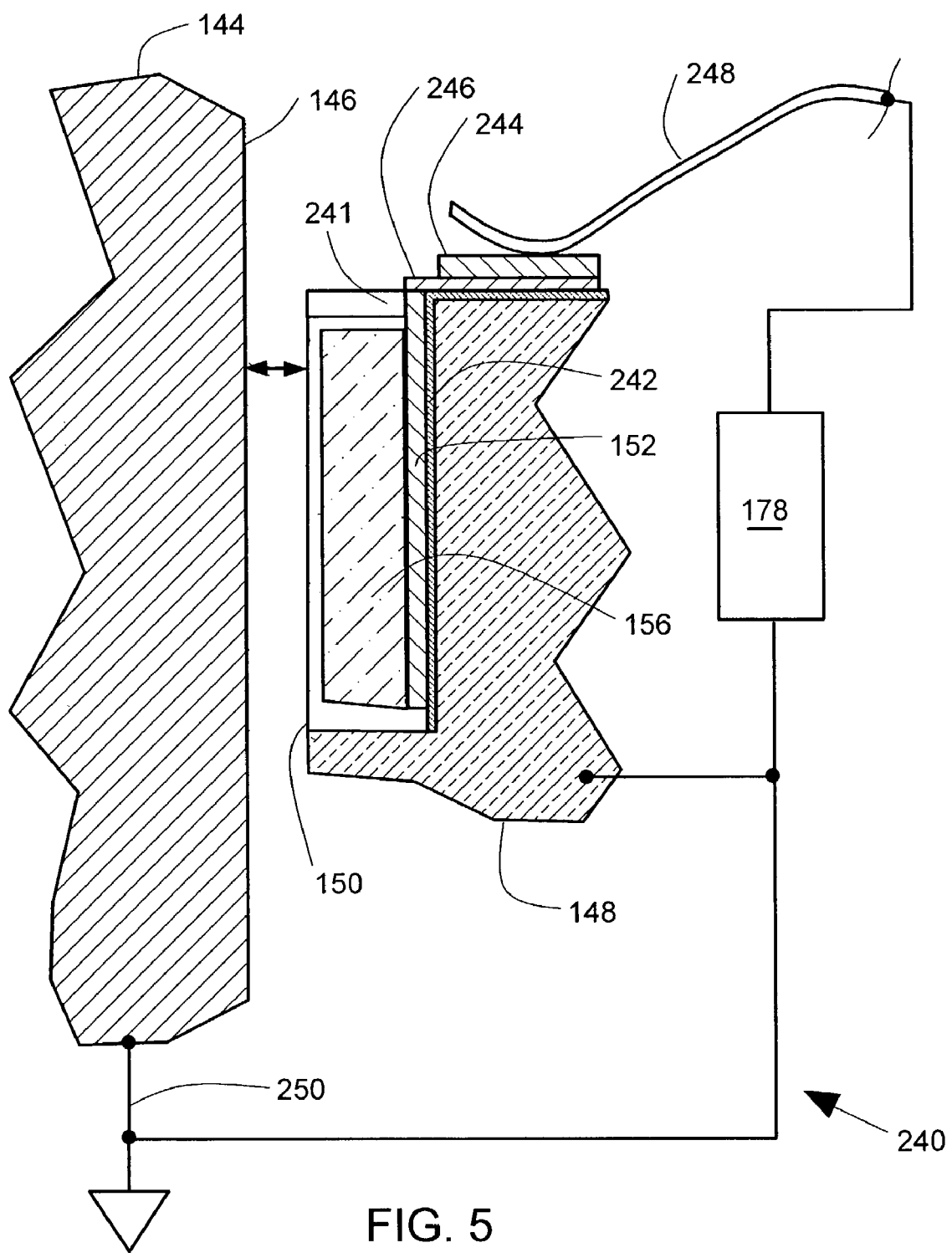
FIG. 5 illustrates a third embodiment of an electrostatic actuator.

FIG. 5 illustrates a third embodiment of an electrostatic actuator 240. The actuator 240 is similar to the actuator 140 in FIG. 1 and reference numerals in FIG. 5 that are the same as reference numerals used in FIG. 1 identify the same or similar features.

In FIG. 5, an electrically insulating layer 242 is disposed between the second body 148 and the conductor layer 152. The conductor layer extends through a groove in the body 148 to form a connection lead 246. A contact pad 244 is disposed on the connection lead 246. The connection lead 246 electrically couples between the conductor layer 152 and the contact pad 244. A flexible lead 248 couples to the contact pad 244 in order to connect the contact pad 244 to a potential source 178 in a flexible manner that does not interfere with spacing changes. The second body 148 in FIG. 5 can be made of electrically conducting material and is preferably connected by a common conductor 250 to the first body 144. An arrangement, such as the one shown in FIG. 5, in which the second body 148 is at the same electrical potential as the first body 144 so that the second body 148 does not generate an electrostatic force is referred to as a "dedicated" electrode arrangement. An arrangement in which the second body 148 is formed of insulating material so that it does not generate an electrostatic force is also referred to as a dedicated electrode arrangement.

Figure 6:
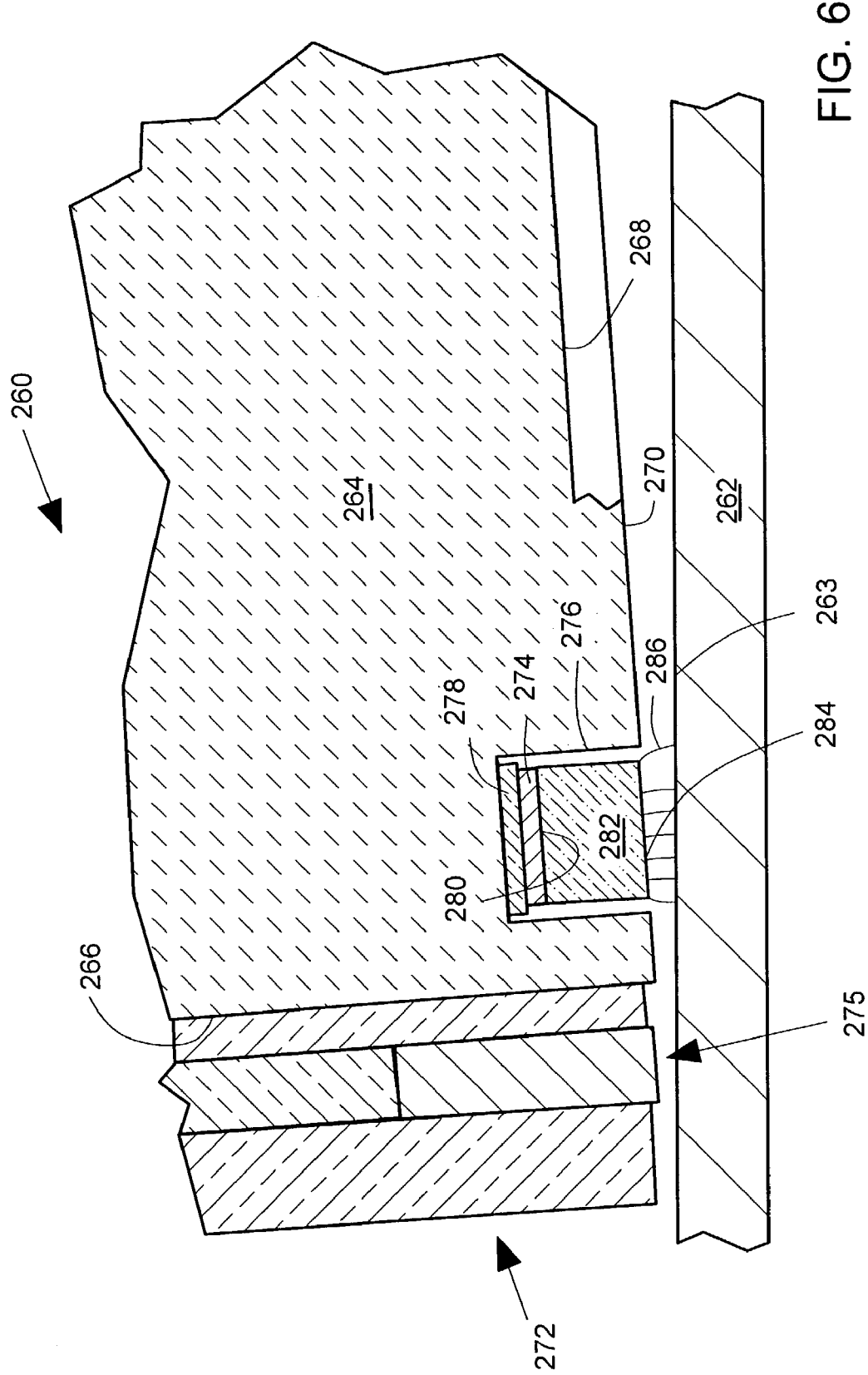
FIG. 6 illustrates a first embodiment of a slider and a disc of a disc drive.

FIG. 6 illustrates a first embodiment of a slider 260 accessing data stored on a disc 262 of a disc drive (for example, disc drive 100 described below in connection with FIG. 7). The disc 262 has an electrically conducting surface 263.

The slider 260 includes a slider substrate 264 having a trailing side 266, a bottom side 268 facing the disc 262, and raised surface 270 that protrudes from the bottom side 268. The raised surface 270 forms a first portion of an air bearing surface that generates an aerodynamic lift force as it rides on an air bearing layer as the disc 262 spins.

The slider 260 also includes a read/write head 272 on the trailing side. The read/write head 272 accesses the stored data and has a head surface 275 that forms a second portion of the air bearing surface.

A conductor layer 274 is insulatingly recessed in a cavity 276 that opens at the air bearing surface. The conductor layer 274 is deposited on an insulation layer 278 to provide insulation. The conductor layer 274 has a conductor face 280 that faces the disc 262.

An actuator electrode 282 is disposed on the conductor face 280 and has an electrode face 284 that faces the disc 262 across an electrostatically charged portion 286 of the air bearing layer. The actuator electrode 282 comprises a semi-insulating material having a combination of electrical resistivity and thickness which prevents shorting of the conductor layer 280 to the electrical conducting surface through a debris particle in the electrostatically charged portion 286 (spacing). The slider 260 can be used, for example, in a disc such as disc 100 described below in connection with FIG. 7.

Figure 7:
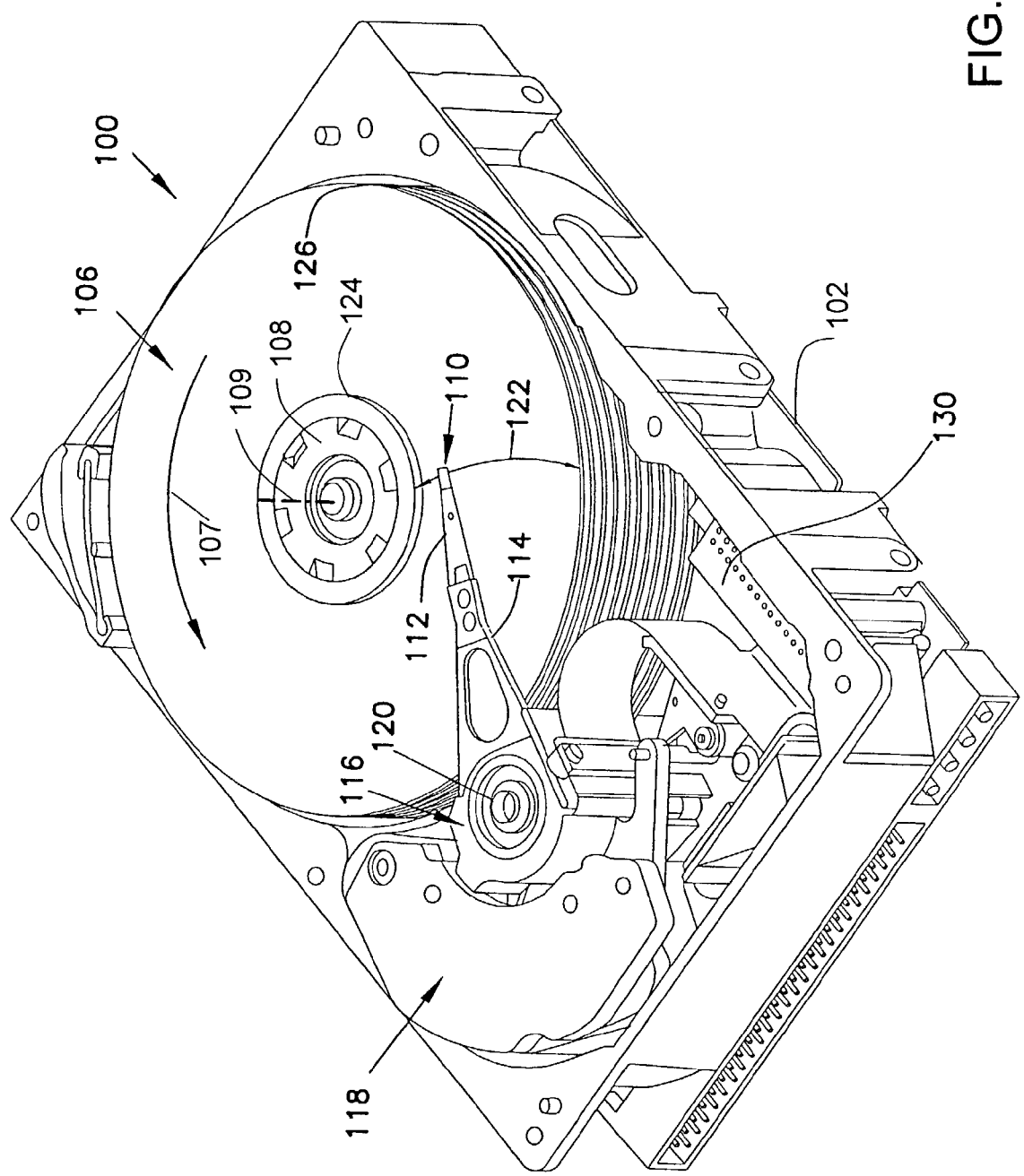
FIG. 7 illustrates an oblique view of a disc drive.
Figure 8:
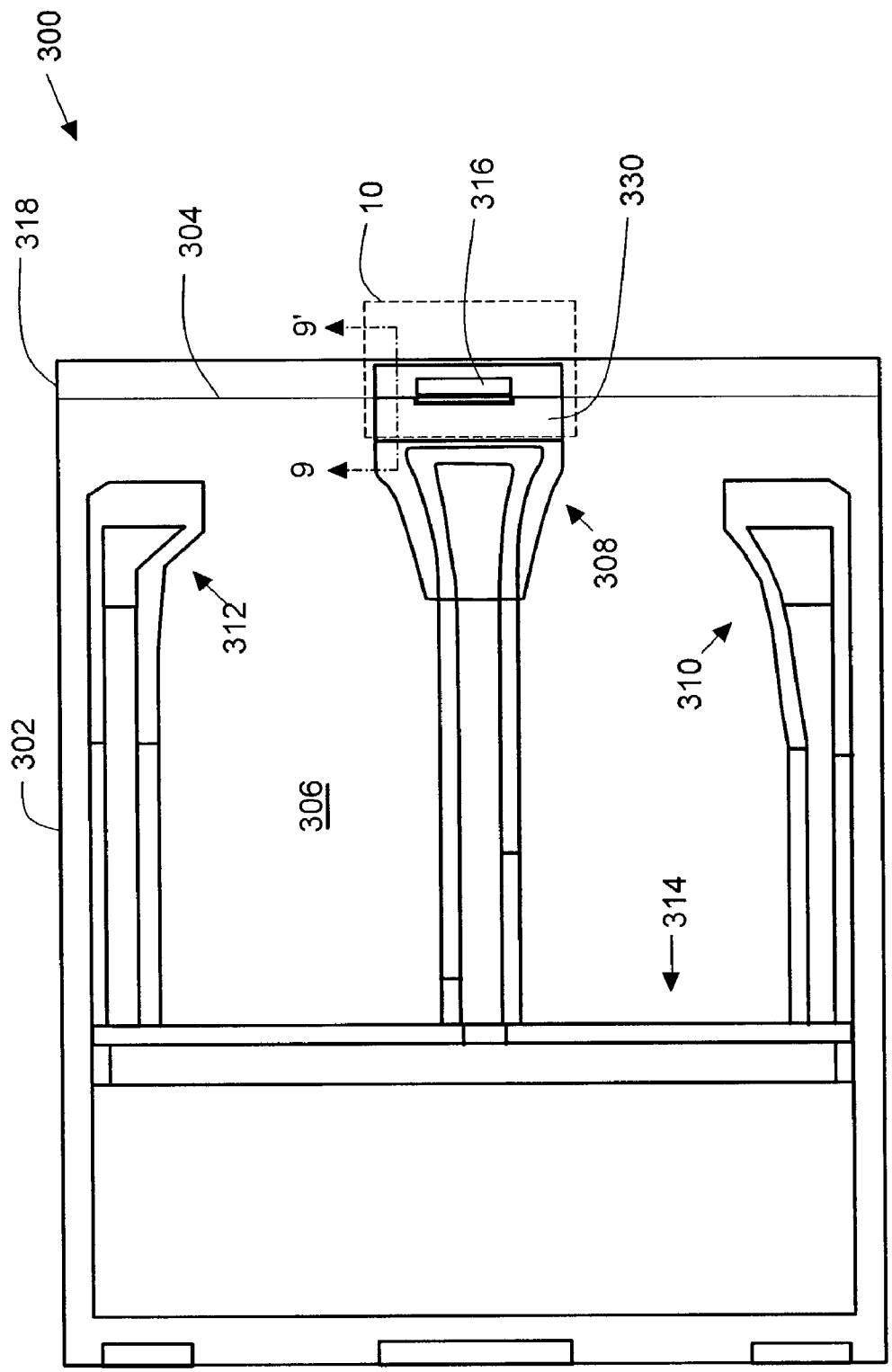
FIG. 8 illustrates a second embodiment of a slider.

FIG. 7 is an oblique view of a disc drive 100 in which the slider illustrated in FIG. 8 can be used. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 11:
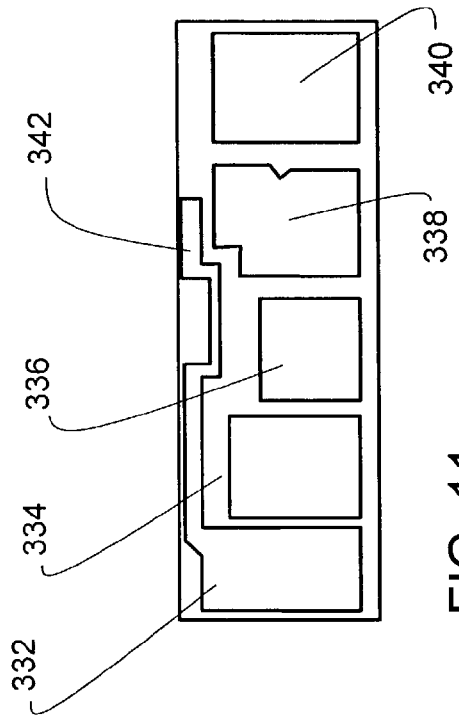
FIG. 11 illustrates contact pads and a connection lead on a slider.
Figure 9:
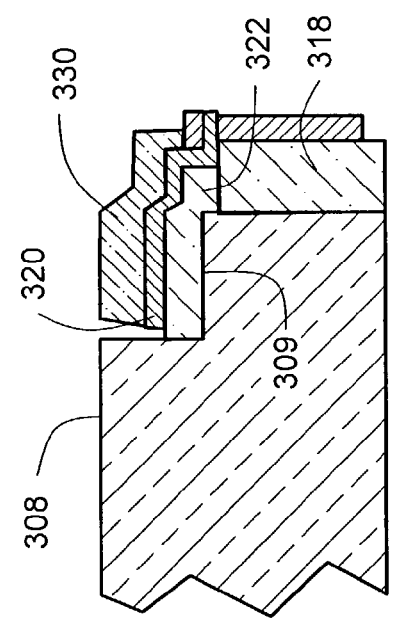
FIG. 9 illustrates a partial cross sectional view along line 9–9' in FIG. 8.
Figure 10:
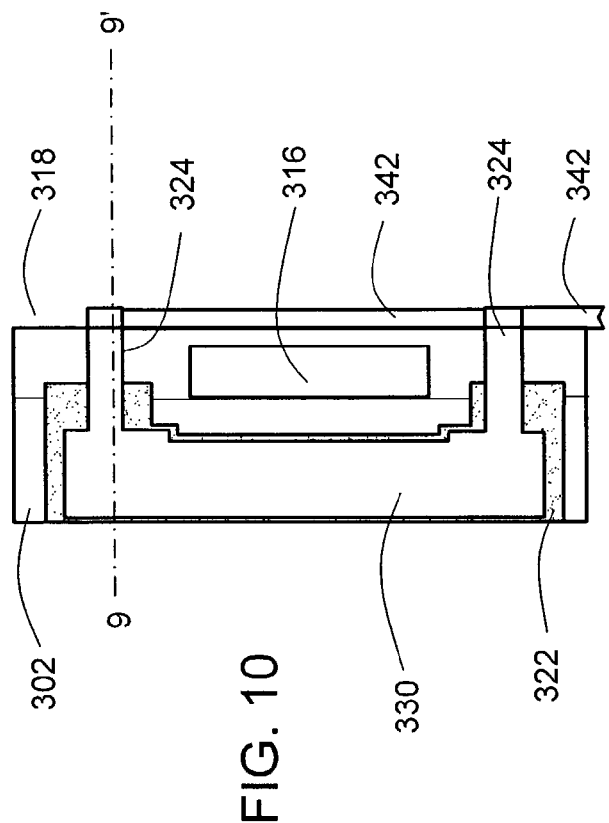
FIG. 10 illustrates an enlarged view of a portion of FIG. 8

FIGS. 8–11 illustrate a second embodiment of a slider 300. FIG. 8 illustrates a bottom view of the slider 300. FIG. 9 illustrates a partial cross sectional view along line 9–9' in FIG. 8. FIG. 10 illustrates an enlarged bottom view of region 10 in FIG. 8. FIG. 11 illustrates a trailing edge view of the slider 300. Various layers illustrated in FIGS. 9–11 are extremely thin, but have been enlarged to better illustrate the layers and interconnections. Therefore, the scales used in FIGS. 9–11 vary.

The slider 300 includes a substrate 302 that has a trailing side 304, a bottom side 306 that faces a disc (not illustrated) and various raised surfaces 308, 310, 312, 314 that protrude from the bottom side 306 and form various portions of an air bearing surface. A read/write head 316 is deposited on the trailing side 304. The read/write head 316 is deposited in various insulating layers 318 on the trailing edge. A conductor layer 320 is deposited over an insulating layer 322 in a cavity on the raised surface 308 as best seen in FIGS. 9–10. The conductor layer 320 includes leads 324 that extend over the insulating layers 318 as best seen in FIG. 10. Bonding pads 332, 334, 336, 338, 340 are deposited on the trailing side of the insulating layers 318 (FIG. 11). One of the bonding pads, bonding pad 332, is used for the electrostatic actuator and includes a lead 342 that contacts the leads 324. An actuator electrode 330 is deposited over the conductor layer 320 (FIG. 9). The actuator electrode 330 leads the read/write head 316 in the airflow. The actuator electrode 330 and the conductor layer 320 are recessed into the air bearing surface 308 (FIG. 9). The actuator electrode 330 is positioned directly in front of the read/write head or transducer 316 so the actuator electrode flies close to the transducer 316 and also close to the disc. A portion of the air bearing layer is electrostatically charged in a location where it can produce the greatest electrostatic force for controlling the fly height of the transducer 316. The arrangement uses one electrode instead of two electrodes to avoid unintended slider roll if the applied voltages or areas are slightly different on opposite sides of the transducer 316.

Exemplary steps for producing the electrode stack are best illustrated in FIG. 9. First, a "nest" or cavity 309 is etched into an air bearing surface 308 of a substrate 302, preferably AlTiC. Then, the insulation layer 322, preferably alumina, is deposited on the AlTiC substrate 302, followed by a metallic layer 320, preferably Cr, and an electrode (cap) layer 330 of resistive material, preferably diamond-like carbon (DLC). The thickness of the DLC layer is adjusted in consideration of it resistivity to provide the desired current limiting for a particular application. Diamond-like carbon is also preferred for the layer 330 because it can be processed to provide a desired smooth surface characteristic with a work function that resists dielectric breakdown. The cap layer serves to protect the metallic layer and conduct charge to surface of the electrode stack while preventing electrical discharge to the disc. The electrode 320 connects via lead 342 to the bond pad 332 on the trailing edge of the slider where an external control voltage is applied by a flexible lead. In one preferred arrangement, the cavity 309 is about 900 Angstroms deep with a 150 Angstrom thick alumina insulator, a 200 Angstrom thick Cr electrode, and a 450 Angstrom thick DLC cap. If different electrode materials are used, electrode thickness will change and the depth of the cavity 309 can be adjusted to accommodate the desired thicknesses.

Figure 12:
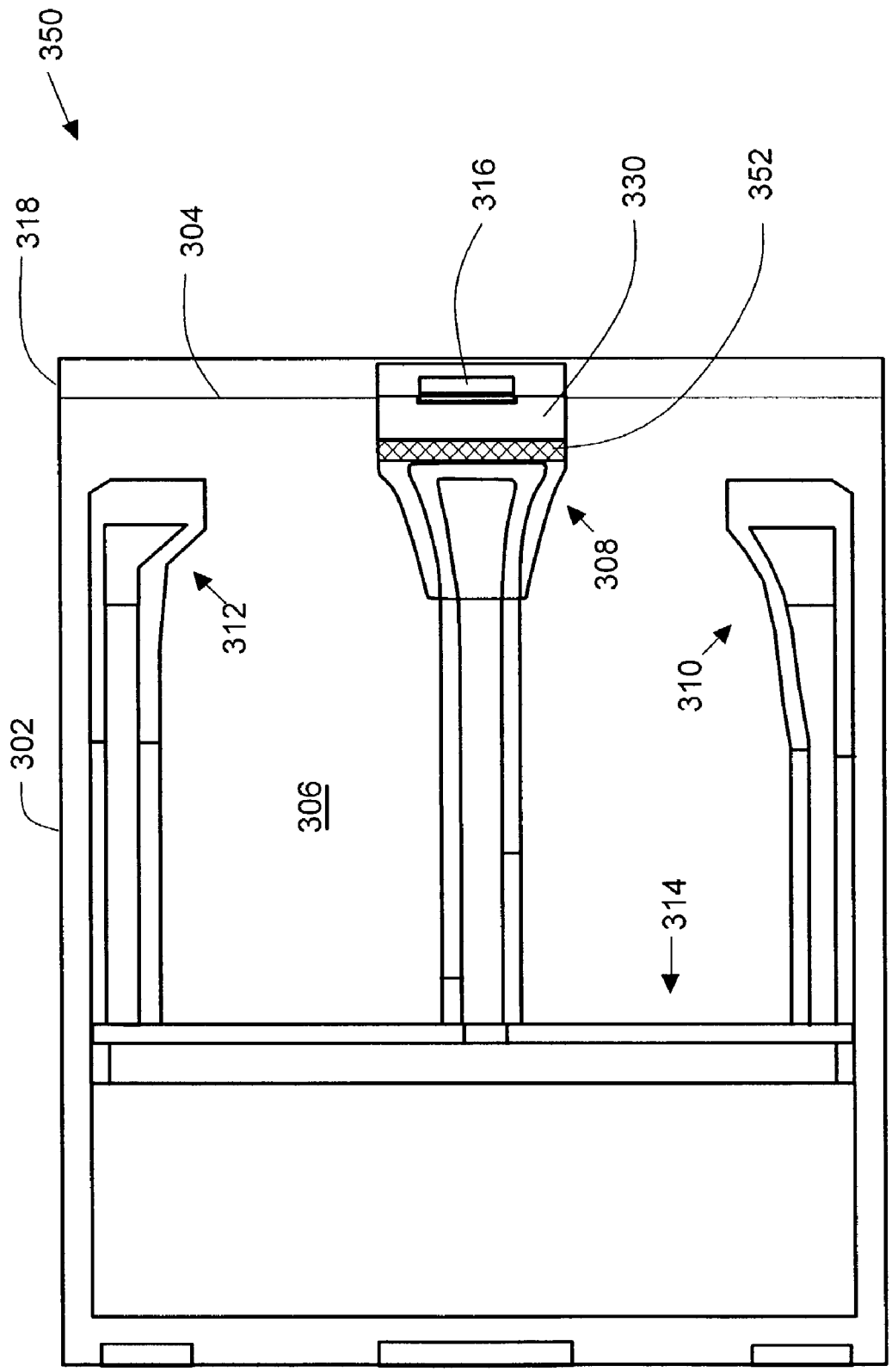
FIG. 12 illustrates a third embodiment of a slider.

FIG. 12 illustrates a third embodiment of a slider 350. The arrangement shown in FIG. 12 is similar to the arrangement shown in FIGS. 8–11, and reference number numbers used in FIG. 12 that are the same as reference numbers used in FIGS. 8–11 identify the same or similar features. In FIG. 12, a deep trench 352 is etched in front of the actuator electrode 330. The trench 332 help to aerodynamically decouple the electrode recession and pole tip fly height (PTFH) as explained below in connection with FIGS. 13–14.

Figure 13:
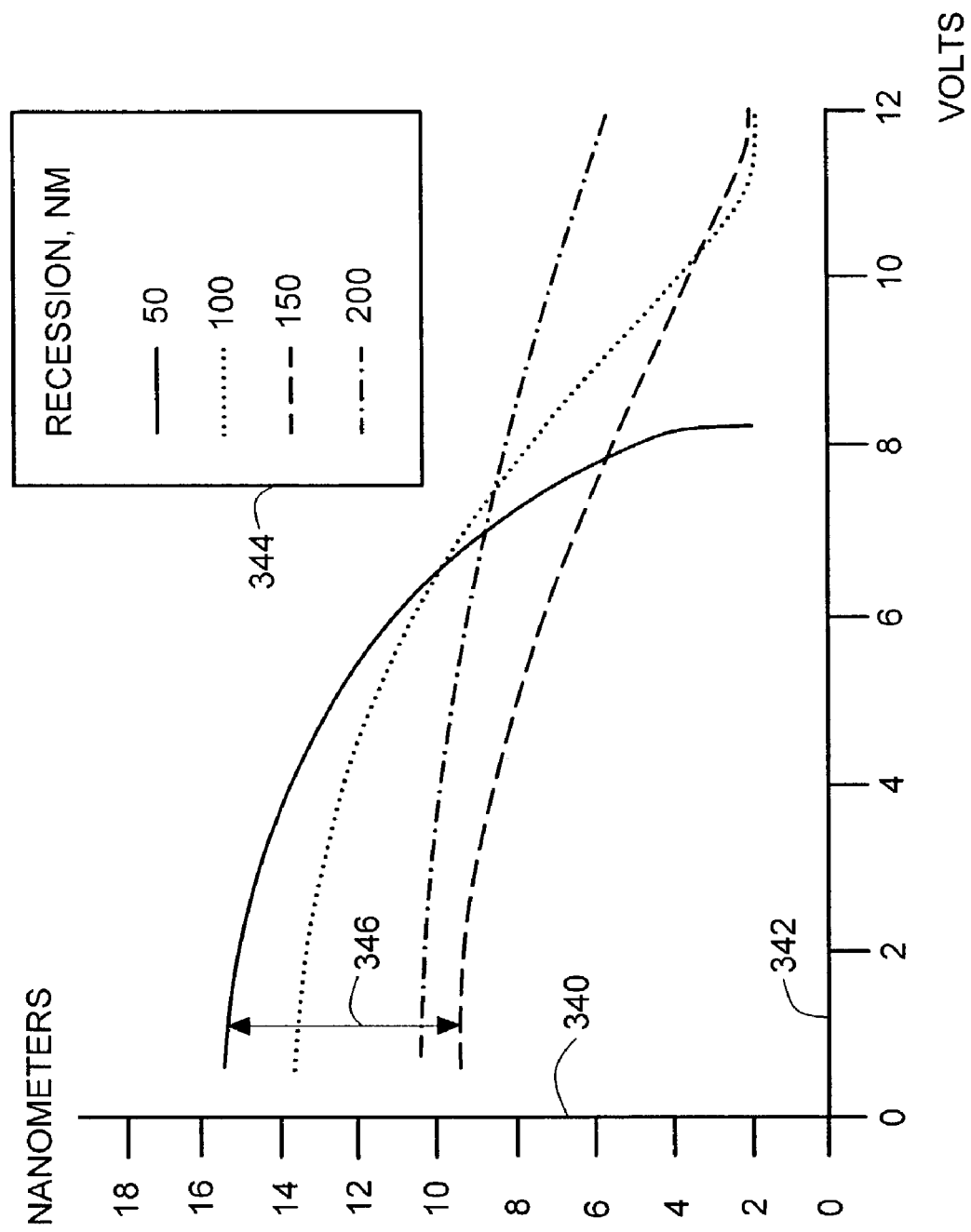
FIG. 13 illustrates a graph of pole to disc spacing as a function of electrode voltage for different recession depths of electrode faces for the arrangement illustrated in FIGS. 8–11.

FIG. 13 illustrates a graph of pole to disc spacing as a function of electrode voltage for different recession depths of electrode faces for the arrangement illustrated in FIGS. 8–11. A vertical axis 340 represents the pole-to-disc spacing (PTFH) in nanometers, and a horizontal axis 342 represents a control voltage applied between the actuator electrode and a disc. Four configurations with different recession depths (as indicated in key 344) are compared. As shown in FIG. 13, the electrode recession and PTFH are strongly coupled in the slider 300 as indicated by the wide spread 346 of PTFH. This is undesirable because the slider fabrication process will generally produce some variation in electrode recession, which will cause variation in initial fly height and in the voltage needed to produce the desired fly height change.

Figure 14:
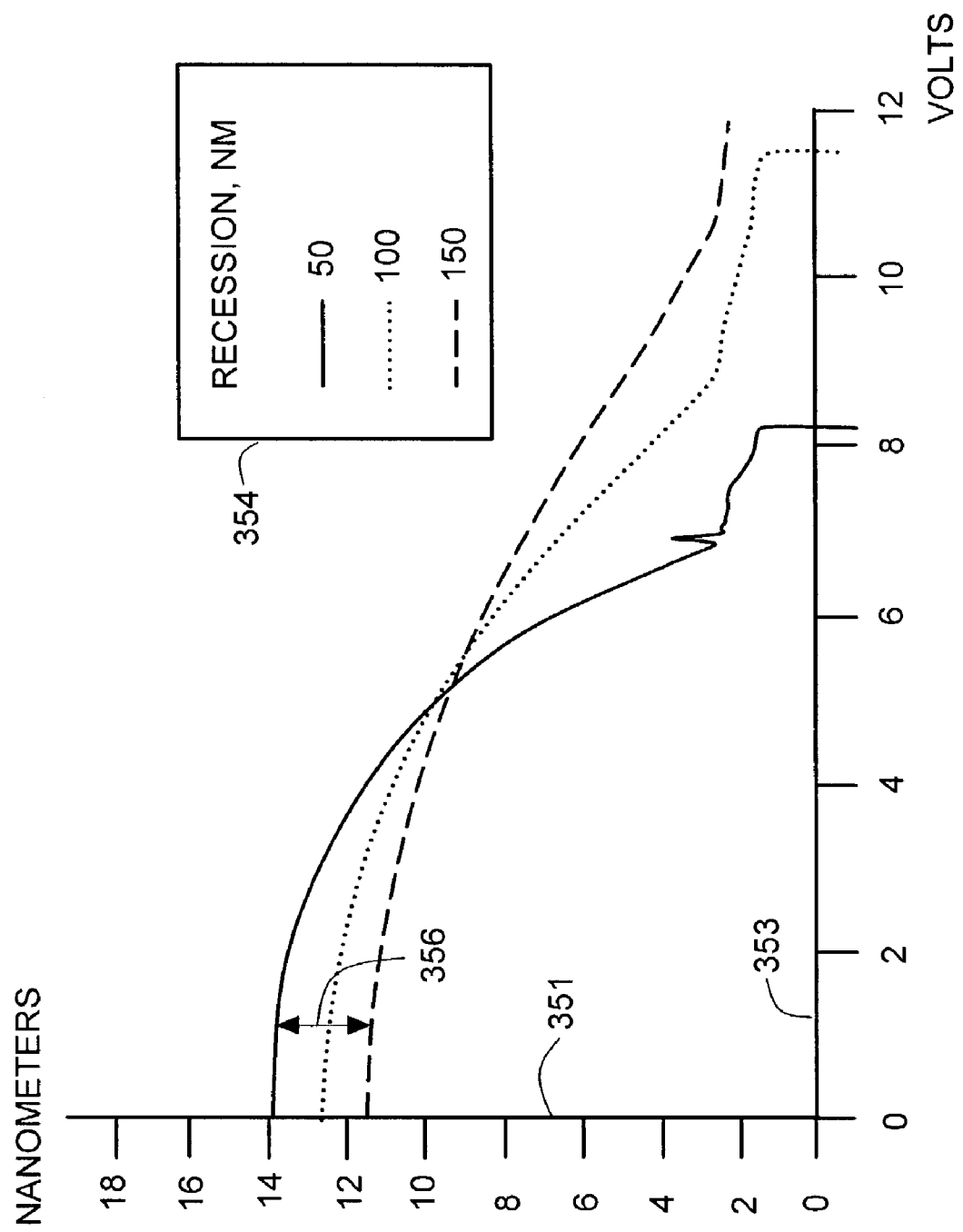
FIG. 14 illustrates a graph of pole to disc spacing as a function of electrode voltage for different recession depths of electrode faces for the arrangement illustrated in FIG. 12.

FIG. 14 illustrates a graph of pole to disc spacing as a function of electrode voltage for different recession depths of electrode faces for the arrangement illustrated in FIG. 12. A vertical axis 351 represents a pole-to-disc spacing in nanometers, and a horizontal axis 353 represents an applied potential in volts. In FIG. 14, modeling indicates that a 1 $\mu$m deep, 15 $\mu$m wide trench will provide sufficient decoupling (0.1 nm PTFH change per nm electrode recession.) As illustrated at 356, a reduced variation due to recession is obtained in comparison the larger variation 346 illustrated in FIG. 13.

Figure 15:
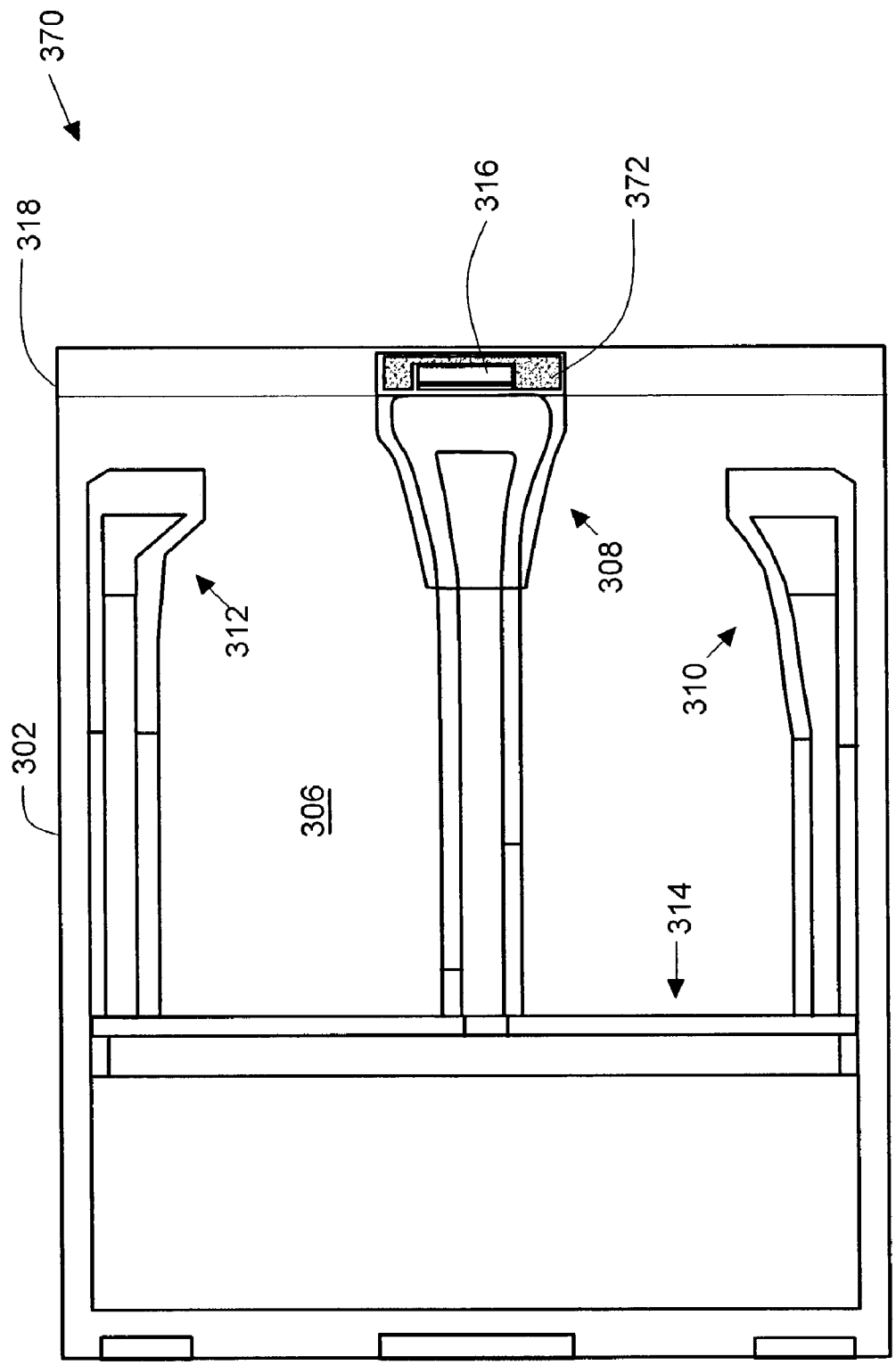
FIG. 15 illustrates a fourth embodiment of a slider.

FIG. 15 illustrates a fourth embodiment of a slider 370. The slider 370 of FIG. 15 is similar to the slider 300 of FIG. 8, and reference numbers used in FIG. 15 that are the same as reference numbers used in FIG. 8 identify the same or similar features. In FIG. 15, an actuator electrode 372 is deposited over insulating layers 318 on the trailing side of the slider. The actuator electrode 372 trails the read/write head 316. This arrangement avoids milling the two-phase AlTiC slider substrate 302 and avoids depositing an insulator layer (since AlTiC is conductive) to isolate the charged electrode from the slider body as shown in FIG. 8. In FIG. 15, a conductive layer and the actuator electrode 372 are deposited over insulating layer 318 which are already in place as part of the read/write head structure. The advantage of this is two-fold. Since alumina is a single-phase material, the initial milling before electrode deposition is more uniform. Secondly, because alumina is non-conducting, an insulator layer does not need to be deposited under the conductive layer. The overall milling variation is reduced because the milled electrode nest is shallower without the insulator layer and the alumina is single-phase. This yields a more predictable electrode depth and thus a more predictable dedicated electrostatic actuator system. In addition, the complicated process of preparing the AlTiC substrate to receive the electrode structure is eliminated.

FIG. 16 illustrates a graph of pole-to-disc spacing as a function of electrode voltage for the arrangement illustrated in FIG. 15. A vertical axis 380 represents pole-to-disc spacing in nanometers, and a horizontal axis 382 represents a potential in volts applied between the actuator electrode 372 and a disc. A curve 384 represents the pole-to-disc spacing as a function of the applied potential. In can be seen that there is a well defined relationship that provides better control between 0 and about 6 volts. FIG. 16 shows the FH change versus electrostatic voltage for the electrode-on-alumina design.

In summary, an electrostatic actuator (such as 140) is used to adjust a spacing (such as 142). The electrostatic actuator comprises a first body (such as 144) that includes an electrically conducting surface (such as 146), and a second body (such as 148) that has a body surface (such as 150) separated by the spacing from the electrically conducting surface. A conductor layer (such as 152) with a conductor face (such as 154) is insulatingly recessed in the body surface of the second body. An actuator electrode (such as 156) is disposed on the conductor face and has an electrode face (such as 158) that faces the electrically conducting surface across the spacing. The actuator electrode comprises a semi-insulating material. The semi-insulating material has a combination of electrical resistivity and thickness T which prevents shorting of the conductor layer to the electrical conducting surface through a dielectric breakdown in the spacing.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the electrostatic actuator system while maintaining substantially the same functionality without departing from the scope and spirit of the present invention. In addition, although the preferred embodiment described herein is directed to a electrostatic actuator system for controlling spacing between two bodies, it will be appreciated by those skilled in the art that the teachings of the present invention can be applied to multiple electrostatic actuators controlling multiple spacings between multiple bodies in a more complex positioning arrangement, without departing from the scope of the present invention.

What is claimed is:

1. An electrostatic actuator for adjusting a spacing, comprising;
   a first body including an electrically conducting surface;
   a second body having a body surface separated by the spacing from the electrically conducting surface;
   a conductor layer insulatingly recessed in the second body surface, the conductor layer having a conductor face; and
   an actuator electrode disposed on the conductor face and having an electrode face that faces the electrically conducting surface across the spacing, the actuator electrode comprising a semi-insulating material having a relaxation time such that, after removal of a temporary short circuit, the electrode face recharges to 63% of a potential on the conductor layer in no more than 50 microseconds.

2. The electrostatic actuator of claim 1 wherein the second body is electrically insulating and the conductor layer is disposed on the second body.

3. The electrostatic actuator of claim 1 wherein the spacing is no more than 250 Angstroms.

4. The electrostatic actuator of claim 1 wherein the spacing is subject to transient dielectric breakdown, and wherein the semi-insulating material has an electrical resistance that, upon a short circuit of the electrode face to the electrically conducting surface by the air dielectric breakdown, limits electrical discharge of the conductor layer.

5. The electrostatic actuator of claim 1 wherein the spacing is subject to transient dielectric breakdown, and wherein the semi-insulating material has an electrical resistivity and thickness such that a short circuit by the breakdown is localized to a portion of the electrode face around the breakdown, and portions of the electrode face remote from the breakdown are not short circuited.

6. The electrostatic actuator of claim 1 further comprising:
   a suspension coupled between the first and second bodies to resiliently suspend the second body at a nominal spacing from the first body, and
   a potential source applying a adjustment potential between the conductor layer and the electrically conducting surface to generate an attractive force between the electrode face and the electrically conducting surface that adjusts the spacing from the nominal spacing to an adjusted spacing.

7. The electrostatic actuator of claim 6 wherein the potential source has a source resistance and the actuator electrode has a shorted resistance through the dielectric breakdown, and the shorted resistance is at least 10 times the source resistance.

8. The electrostatic actuator of claim 1 further comprising an electrically insulating layer disposed between the second body and the conductor layer.

9. The electrostatic actuator of claim 1 further comprising a contact pad on the second body and a connection lead coupled between the conductor layer and contact pad.

10. The electrostatic actuator of claim 9 further comprising a flexible lead coupled to the contact pad.

11. The electrostatic actuator of claim 1 wherein the first body has an electrical potential that is equal to an electrical potential of the second body.

12. A slider for accessing data stored on a media, comprising:
   a slider substrate having a trailing side, and a bottom side facing the media, the bottom side including a raised surface;
   a multilayer electrode stack that includes a conductor layer and a semi-insulating actuator electrode insulatingly embedded in a recess; and
   the conductor layer extends from the recess through a groove to form a connection lead.

13. The slider of claim 12 including a trench cut alongside the actuator electrode, the trench providing aerodynamic decoupling between a face of the actuator electrode and the raised surface.

14. The slider of claim 12 wherein the actuator electrode trails a read/write head on the slider substrate.

15. The slider of claim 12 wherein the actuator electrode leads a read/write head on the slider substrate.

16. (new) The slider of claim 12 wherein a spacing between the actuator electrode and the media is no more than 250 Angstroms.

17. The slider of claim 12 wherein a spacing between the actuator electrode and the media is subject to transient dielectric breakdown, and wherein the semi-insulating material has an electrical resistance that, upon a short circuit of the electrode face to the media, limits electrical discharge of the conductor layer.

18. The slider of claim 12 wherein a spacing between the actuator electrode and the media is subject to dielectric breakdown, and wherein the semi-insulating material has an electrical resistivity and thickness such that a short circuit by the breakdown is localized to a portion of the electrode face around the breakdown, and portions of the electrode face remote from the breakdown are not short circuited.

19. The slider of claim 12 further comprising:
   a suspension coupled between the slider and the media to resiliently suspend the slider at a nominal spacing from the media, and
   a potential source applying a adjustment potential between the conductor layer and the media to generate an attractive force between the electrode face and the media that adjusts the spacing from the nominal spacing to an adjusted spacing.

20. The slider of claim 12 wherein the potential source has a source resistance and the actuator electrode has a shorted resistance through the dielectric breakdown, and the shorted resistance is at least 10 times the source resistance.

21. The slider of claim 12 further comprising an electrically insulating layer disposed between the slider substrate and the conductor layer.

22. The slider of claim 12 further comprising a contact pad on the slider substrate and a connection lead coupled between the conductor layer and contact pad.

23. The slider of claim 12 further comprising a flexible lead coupled to the contact pad.

24. The slider of claim 12 wherein the slider substrate has an electrical potential that is equal to an electrical potential of the media.

25. An electrostatic actuator for adjusting a spacing, comprising;
   first and second bodies separated by a spacing with a conductor face in a recess in the second body for receiving an electrostatic actuator electrode;
   an electrostatic actuator electrode embedded in the recess and formed of semi-insulating material having a combination of electrical resistivity and thickness which prevents shorting of the conductor layer to the electrical conducting surface through a dielectric breakdown in the spacing; and an insulating layer disposed between the second body and the conductor face.

26. The electrostatic actuator of claim 25 wherein the spacing is subject to transient dielectric breakdown, and wherein the electrostatic actuator electrode has an electrical resistance that, upon a short circuit of the electrode face to the disc by the dielectric breakdown, limits electrical discharge of the conductor layer.

27. The electrostatic actuator of claim 25 wherein the spacing is subject to transient dielectric breakdown, and wherein the electrostatic actuator electrode has an electrical resistivity and thickness such that a short circuit by the dielectric breakdown is localized to a portion of the electrode face around the particle, and portions of the electrode face remote from the particle are not short circuited.

* * * * *